FLUID PULSE FORMER

Filed Aug. 26, 1963

INVENTOR

PETER BAUER

BY *Griffin and Stokes*

ATTORNEYS

United States Patent Office 3,266,509
Patented August 16, 1966

3,266,509
FLUID PULSE FORMER

Peter Bauer, Rockville, Md., assignor to Sperry Rand Corporation, New York, N.Y., a corporation of Delaware Filed Aug. 26, 1963, Ser. No. 304,483
5 Claims. (Cl. 137—81.5)

The present invention relates to a fluid pulse former which generates an output fluid pulse independent of the kind or duration of input pulse energy.

Fluid systems for control or data processing functions have received considerable attention within the past few years, particularly with the advent of the so-called pure fluid amplifier. By means of a fluid medium, information can be transferred between logical elements by a fluid pulse which is normally distinguished by different levels of fluid energy within a channel. Quite often in such a system there is need for a fluid device which, upon receipt of a fluid pulse of some variable magnitude or duration, produces an output fluid pulse of predetermined magnitude and duration.

One object of the present invention is to therefore provide a fluid pulse former which incorporates a pure fluid amplifier for generating an output fluid pulse of predetermined magnitude and duration in response to an input fluid pulse of variable parameters.

Another object of the present invention is to provide a fluid pulse former comprised of a fluid amplifier having two output channels connected in parallel each with a different fluid pulse delay characteristic.

These and other objects of the present invention will become apparent during the course of the following description to be read in view of the drawing, in which.

Figure 1:
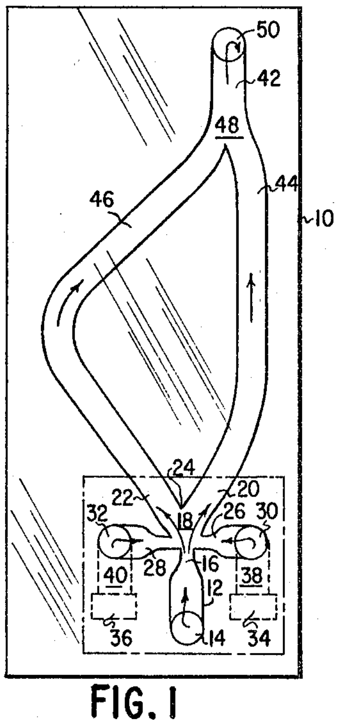
FIGURE 1 is a plan view of one embodiment of the invention utilizing a bistable DOFL pure fluid amplifier.

Referring first to FIGURE 1, there is shown the plan view of one embodiment of the invention which makes use of a bistable pure fluid amplifier originally developed by the Diamond Ordnance Fuse Laboratory (DOFL). In general, a plurality of interconnected fluid channels are cut or otherwise formed in a body 10 of fluid impervious material which may be transpartent plastic or the like. A preferred mode of constructing these channels is the use of a center slab of plastic in which the channels are cut completely through from surface to surface, the center slab then being sandwiched between two cover plates so as to form the top and bottom walls of the channels. These channels then have a rectangular cross-section. A power stream input channel 12 receives relatively high energy fluid entering at port 14 from a pump or compressor source not shown. Power stream channel 12 narrows to a nozzle section 16 which terminates in a fluid interaction chamber 18. Branching from said chamber 18 are two power stream output channels 20 and 22 which intersect at a divider edge 24. Also entering chamber 18 at angles approximately perpendicular to power stream channel 12 are two opposed control stream channels 26 and 28. Each control channel selectively receives control fluid pulse energy via a respective input port 30 and 32 from control sources 34 and 36 which are shown in dotted outline only. These control sources 34 and 36 may be connected to ports 30 and 32 by channels 38 and 40, respectively, which are also shown in dotted outline.

The channels so far described form a pure fluid amplifier well known in the art. The power stream jet exiting from nozzle 16 into chamber 18 may be directed into one or the other of the output channels 20 or 22 by means of control stream fluid from channels 28 or 26, respectively. By adjusting the physical dimensions and operating pressures, the amplifier may be made bistable such that the power stream remains flowing in a particular output channel to which it is directed even after termination of the switching control stream. This phenomenon is due to creation of the well known boundary layer lock-on effect. For example, assume that the relatively high energy power stream flows through channel 20 at a time when neither channel 26 nor channel 28 has control stream fluid. Now assume that a control fluid stream of relatively low energy issues from channel 26 into chamber 18 in a manner to destroy the boundary layer in output channel 20. At this time, the power stream commences to switch towards its center undeviated position. In so doing it entrains fluid so that a boundary layer effect commences in output channel 22. This causes the power stream to exit through said channel 22 from chamber 18. The control stream from channel 26 may now be terminated without causing the power stream to switch back to channel 20. When it is necessary to switch the power stream back into channel 20, control stream fluid is temporarily introduced through channel 28 which destroys the boundary layer in channel 22 and forces the power stream back into channel 20 where it remains even after termination of the channel 28 control stream.

A further power stream output channel 42 with input at 48 and output at 50 is provided in body 10 for receiving power stream flow from either channels 20 or 22. Connected between channel 42 and channel 20 is channel 44 of some finite length. Connected between channel 42 and channel 22 is another channel 46 which is longer than channel 44. The sum of the lengths of channels 20 and 44 (hereafter referred to as 20') is less than the sum of the lengths of channels 22 and 46 (hereafter referred to as 22'). Channels 44 and 46 may in effect be thought of as extensions of channels 20 and 22, respectively, with channels 20' and 22' comprising delay means connected in parallel between chamber 18 and output channel 42. Thus, it will be seen that all power stream fluid entering body 10 at port 14 will exhaust from body 10 via port 50 to a utilization device not shown in FIGURE 1.

Figure 2:
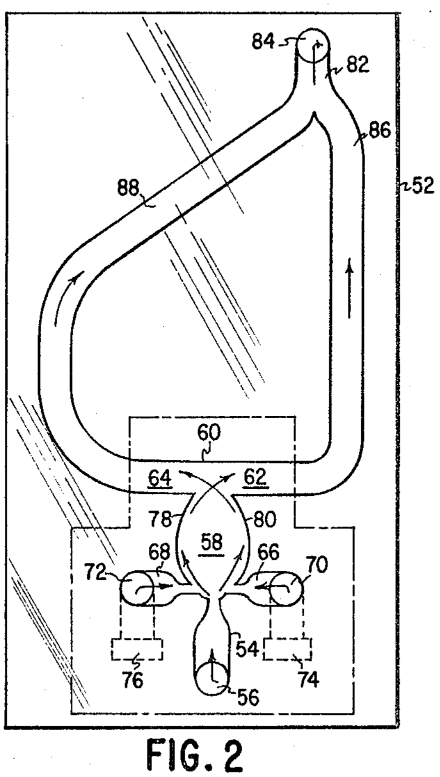
FIGURE 2 is a plan view of the invention utilizing a bistable vortex fluid amplifier.

FIGURE 2 is an alternate embodiment of the invention which differs from that in FIGURE 1 merely in the employment of a somewhat different type of pure fluid bistable amplifier. The fluid channels in FIGURE 2 are formed in a body 52 in the same manner as those formed in body 10. A power stream input channel 54 is supplied via port 56 with relatively high energy fluid which exits into a fluid interaction chamber 58. This chamber 58 is generally elliptical in shape. The end of the chamber opposite channel 54 exits into a channel 60 generally perpendicular thereto and which, in effect, is formed by two power stream output channels 62 and 64. Control stream input channels 66 and 68 are also provided with respective input ports 70 and 72 from external control stream sources 74 and 76.

The fluid channels so far described in connection with FIGURE 2 form a pure fluid vortex amplifier. Its operation may be simply described as follows. By temporarily causing control stream fluid to flow from channel 66, the power stream from channel 54 is deflected to the left so as to flow along wall 78 of chamber 58. This flow creates a circulating vortex in chamber 58 which maintains the power stream against wall 78 even after termination of the control pulse. For this stable path of flow the power stream enters channel 60 at an angle so that only output channel 62 receives it for further transmission.

By now temporarily issuing control stream fluid from channel 68, the power stream is deflected to thereafter flow adjacent wall 80 of chamber 58 so as to enter output channel 64. Power stream flow along wall 80 is also stable in that it continues after termination of control stream energy from channel 68. Consequently, it may be seen that the fluid amplifiers of FIGURE 1 and FIGURE 2 are basically identical in function since each is able to direct power stream flow into one of two output channels upon receipt of selectively applied control fluid pulses.

FIGURE 2 further shows a power stream output channel 82 which exits from body 54 by means of port 84. A channel 86 of finite length is connected between output channel 82 and channel 62, while a channel 88 of longer length is connected between channel 82 and channel 64. The sum of the lengths of channels 86 and 62 (hereafter designated as 62') is shorter than the sum of lengths of channels 88 and 64 (hereafter designated as 64'), with these two composite channels in effect being connected in parallel between channel 82 and chamber 58.

Figure 3:
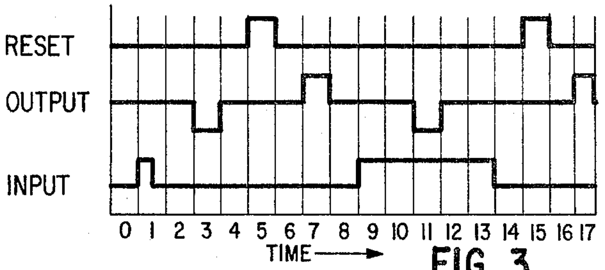
FIGURE 3 is a timing chart illustrating the operation of the embodiments in FIGURES 1 and 2.

The preferred mode of operation of FIGURE 1 and FIGURE 2 may be best understood by reference to FIGURE 3, which illustrates the relationship between input control pulses and output power pulses. For the purposes of this discussion, it will be assumed that channel 20' in FIGURE 1 (or channel 62' in FIGURE 2) is of a length such that two units of time are required for a change in fluid energy applied to its input from chamber 18 to be manifested at its output to channel 42. As an example, if power stream flow through channel 22' in FIGURE 1 is suddenly switched to channel 20', it requires two units of time for this increase in input energy to channel 20' to be exhibited at the output of channel 20'. A change in fluid energy may be either a change in pressure or mass flow. The channel 22' in FIGURE 1 (or channel 64' in FIGURE 2) is assumed to have a three time unit delay with respect to a change in input fluid energy being manifested at its output. In the preferred embodiment, the time delays exhibited by the channels are due primarily to their physical length, but time delays may also be created in other ways.

Control stream channels 26 and 66 in FIGURES 1 and 2, respectively, are used to emit input control fluid pulses of indefinite or variable duration for which output pulses of predetermined characteristics are desired. The respective opposing control stream channels 28 and 68 are assumed to be connected to fluid sources which are actuated at a time subsequent to the receipt of an input pulse from channels 26 and 66 in order to reset the devices. In both FIGURES 1 and 2, the normal reset condition of the device is considered to be that of power stream flow through the shorter of the two delay channels. In FIGURE 1, this therefore requires power stream flow through channel 20' whereas in FIGURE 2 the power stream flows through channel 62'. To insure that this reset condition is automatically present whenever the power stream is initially turned on, the fluid amplifiers may be constructed with a slight asymmetry in a manner well known to the art.

Referring now to time unit 0 of FIGURE 3, assume that in FIGURE 1 the power stream is flowing through channel 20' prior to the introduction of an input fluid signal to channel 26. A steady state output signal therefore is obtained from channel 42. This steady state output signal is the normal energy level of the fluid output channel. If source 34 is now actuated temporarily beginning at time unit 1 so as to apply a control stream from channel 26, the power stream switches to channel 22'. Assume that the duration of this input control signal from channel 26 is about one-half of a time unit, and that its magnitude is at least equal to the minimum level required to effect switching of the power stream from channel 20' into channel 22'. Further assume that the power stream switches almost instantaneously upon receipt of the leading edge of the input pulse, although in practice this may not occur. Since channel 20' has a two time unit delay, a decrease in energy input thereto is not manifested at its output until the begining of time unit 3. The decrease at the input of channel 20' is assumed to be almost simultaneously accompanied by an increase in energy at the input to chanel 22'. Since channel 22' is a three time unit delay, this energy increase is not manifested at its output until the beginning of time unit 4. Consequently, during time unit 3 there is a decrease in energy output from channel 42 due to the fact that there is no higher energy input thereto from either channel 20' or channel 22'. The duration of this negative or low level output signal depends solely on the difference in time delay between channels 20' and 22', and is thus independent of the duration of the input control signal applied at time unit 1. Said decreased output therefore constitutes the significant output signal of the fluid device in response to an input control signal.

In both FIGURE 1 and FIGURE 2, power stream flow remains stable in the longer delay channel. In order to switch the power stream back into the shorter delay channel so that the device is prepared to receive a subsequent input signal, a reset control pulse stream is applied to the reset channel of these figures. In FIGURE 1 source 36 operates to supply channel 28 with a temporary control fluid stream which switches the power stream back into output channel 20'. In similar fashion, a reset control stream from channel 66 in FIGURE 2 causes the power stream to again flow into output channel 62'. This reset operation in turn causes a temporary increase in output fluid energy over that normally present during the quiescent reset condition of the device, because the increase in energy at the output of channel 20' is manifested one time unit before a decrease in energy at the output of channel 22'. Consequently, there is a summation of relatively high energy fluid from both channels 20' and 22' during one time unit. It will be appreciated that the duration of this temporary high energy output signal is also independent of the reset signal duration, which therefore suggests the following alternative mode of operation of the devices. By making power stream flow through the longer delay path the reset condition, and by reversing the functions of the control channels such that the input pulse is applied via channel 28 and the reest pulse is applied via channel 26, the significant output pulse from the device is positive-going instead of negative-going.

Figure 4:
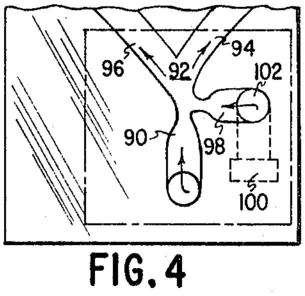
FIGURE 4 is a modification of the invention which utilizes an astable fluid amplifier.
Figure 5:
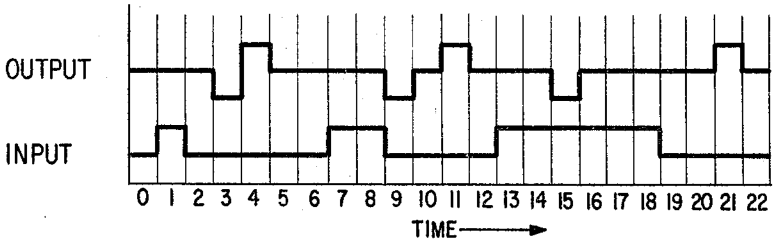
FIGURE 5 is a timing chart illustrating the operation of the embodiment in FIGURE 4.

FIGURE 4 is part of a modified version of the embodiments in FIGURES 1 and 2 wherein the fluid amplifier utilized has but one control channel. A power stream input channel 90 introduces a power stream into interaction chamber 92 from which branches two output power stream channels 94 and 96. A single control input channel 98 is supplied with an input signal pulse from a source 100 via a port 102. The dimensions and pressure of the fluid amplifier are such that power stream flow is stable only in output channel 94. Upon introduction of a control stream, the power stream is deflected into output channel 96 where it remains only so long as the control stream continues to issue from channel 98. The fluid amplifier of FIGURE 4 replaces the fluid amplifier of FIGURE 1 in that delay channel 44 is connected to channel 94, and delay channel 46 is connected to channel 96. Consequently, as best shown in FIGURE 5, the leading edge of a control stream input to FIGURE 4 at time unit 1 causes a decrease in energy two time units later from the output of channel 94', and an increase in energy three time units later from the output of channel 96'. As long as the input signal is present, the power stream remains in channel 96'. In FIGURE 5, the negative-going signal appears during time unit 3. However, assume that the control input pulse is exactly one time unit long so that its trailing edge appears at the beginning of time unit 2. The power stream now switches back from channel 96' into channel 94'. The decrease in energy to channel 96' is not manifested at the common output until after a three time unit delay, or in other words, at the beginning of time unit 5. The increase in energy to channel 94' is manifested at the common output only two time units later. Therefore, during time unit 4 there is reinforcement of two relatively high energy outputs from the delay channels which results in a power stream output higher than that obtained during the quiescent reset condition. As a further example, consider an input signal of a two unit duration which begins at time unit 7 in FIGURE 5. It will be seen that the negative-going output signal is of one time unit duration during time unit 9, whereas a positive-going signal occurs during time unit 11. An even longer input signal, such as that beginning at time unit 13, increases the spacing between the negative and positive-going output signals. In other words, for each change in the input energy, there appears a change in the output energy. In the two control input embodiments of FIGURES 1 and 2, however, only the initial appearance in the input causes a change in the output.

While certain preferred embodiments of the invention have been shown and/or described, it is understood that many modifications may be made thereto by persons skilled in the art without departing from the principles defined in the appended claims.

The embodiments of the invention in which an exclusive property or privilige is claimed are defined as follows:

1. A three-level fluid pulse former comprising:

(a) a fluid output channel with an inlet end and an outlet end;

(b) first and second fluid delay means each with an inlet end and an outlet end, with said outlet end of each of said first and second fluid delay means being connected to the inlet end of said fluid output channel to enable transfer of fluid energy from each of said first and second fluid delay means to said fluid output channel, said first and second fluid delay means having unequal time delay characteristics such that a fluid energy change at their respective inlet ends requires unequal times to be manifested at their outlet ends; and (c) a fluid energy supply means connected to the inlet ends of said first and second fluid delay means which is selectively actuable for shifting, in substantially simultaneous fashion, the fluid energy for one of said inlet ends of one of said first and second fluid delay means to the other inlet end of the other of said first and second fluid delay means so that the fluid energy at the outlet end of said fluid output channel has three significant energy levels consisting of a low energy level where there is no fluid energy output from either outlet end of said first and second fluid delay means, a normal energy level when there is a fluid energy output from one of said outlet ends of said first and second fluid delay means and a high energy level when there is fluid energy output from both of said outlet ends of said first and second fluid delay means, and wherein said low energy and said high energy levels are always applied for time periods of equal duration.

2. The device of claim 1 wherein said first and second fluid delay means comprise fluid channels which are unequal in length.

3. The device of claim 1 wherein the fluid energy supply means consists of a pure fluid amplifier of the type including a power stream input channel, first and second power stream output channels which in turn are respectively connected to the inlet ends of said first and second fluid delay means, and at least one control stream input channel adapted to receive a selectively applied control stream for deflecting the power stream in a manner to shift the power fluid from said first power stream output channel to said second power stream output channel.

4. The device of claim 3 wherein the pure fluid amplifier further includes an elliptical interaction chamber for selectively driving the power stream output to either one of said power stream output channels.

5. The device of claim 3 wherein said first and second fluid delay means comprise fluid channels which are unequal in length.

References Cited by the Examiner

UNITED STATES PATENTS

| | | | |
|---|---|---|---|
| 3,001,539 | 9/1961 | Hurvitz | 137—81.5 |
| 3,001,698 | 9/1961 | Warren | 137—81.5 X |
| 3,117,593 | 1/1964 | Sowers | 137—81.5 X |
| 3,143,856 | 8/1964 | Hausmann | 137—81.5 X |
| 3,153,934 | 10/1964 | Reilly. | |
| 3,177,888 | 4/1965 | Moore | 137—81.5 |
| 3,192,938 | 7/1965 | Bauer | 137—81.5 |

FOREIGN PATENTS 1,278,781 11/1961 France.

OTHER REFERENCES

"Generating Timed Pneumatic Pulses," R. E. Norwood, I.B.M. Technical Disclosure Bulletin, volume No. 5, No. 9, February 1963, pp. 13 and 14.

M. CARY NELSON, *Primary Examiner.*

S. SCOTT, *Assistant Examiner.*